United States Patent [19]

McGarry et al.

[11] Patent Number: 4,591,383
[45] Date of Patent: May 27, 1986

[54] APPARATUS AND METHOD OF FILTERING MOLTEN METAL USING HONEYCOMB STRUCTURE OF SINTERED ALUMINA AS FILTER ELEMENT

[75] Inventors: Charles N. McGarry, Clarksville; Thomas M. Wehrenberg, Jeffersonville, both of Ind.

[73] Assignee: Corning Glass Works, Corning, N.Y.

[21] Appl. No.: 663,022

[22] Filed: Oct. 19, 1984

Related U.S. Application Data

[63] Continuation of Ser. No. 429,654, Sep. 30, 1982, abandoned.

[51] Int. Cl.[4] .............................................. B01D 39/20
[52] U.S. Cl. .................................. 75/93 R; 75/68 R; 210/510.1; 210/767; 210/773; 264/177 P; 266/227; 428/116; 501/127
[58] Field of Search ...................... 210/510.1, 767, 773; 75/93 R, 68 R; 266/227; 428/116, 118

[56] References Cited

U.S. PATENT DOCUMENTS

| | | | |
|---|---|---|---|
| Re. 31,405 | 10/1983 | Paisley | 501/84 |
| 3,112,184 | 11/1963 | Hollenbach | 264/59 |
| 3,255,027 | 6/1966 | Talsma | 501/127 |
| 3,264,124 | 8/1966 | Lauder et al. | 501/127 |
| 3,432,313 | 3/1969 | Gitzen et al. | 501/153 |
| 3,790,654 | 2/1974 | Bagley | 264/177 R |
| 3,893,917 | 7/1975 | Pryor et al. | 75/68 R |
| 3,919,384 | 11/1975 | Cantaloupe et al. | 264/177 R |
| 4,008,033 | 2/1977 | Folmar et al. | 428/116 X |
| 4,024,056 | 5/1977 | Yarwood et al. | 75/68 R |
| 4,164,424 | 8/1979 | Klug et al. | 501/127 |
| 4,253,992 | 3/1981 | Soejima et al. | 428/116 |
| 4,297,140 | 10/1981 | Paisley | 501/84 X |
| 4,300,953 | 11/1981 | Lachman | 501/112 |
| 4,329,162 | 5/1982 | Pitcher | 210/510.1 |
| 4,374,119 | 2/1983 | Schepers et al. | 423/275 X |

FOREIGN PATENT DOCUMENTS

| | | |
|---|---|---|
| 43694 | 1/1982 | European Pat. Off. . |
| 107345 | 5/1984 | European Pat. Off. ............ 266/227 |
| 1068614 | 4/1958 | Fed. Rep. of Germany . |
| 2333973 | 7/1973 | Fed. Rep. of Germany . |
| 2358663 | 11/1973 | Fed. Rep. of Germany . |
| 2623482 | 5/1976 | Fed. Rep. of Germany . |

OTHER PUBLICATIONS

Corning Brochure, "The Unlimiters", Oct. 12, 1981.
Corning Brochure, "MetalFilters", Jul. 27, 1981.
Corning Brochure, "Celcor ®", Jun. 1977.
"Sintering and Grain Growth of Alpha-Alumina", Cahoon and Christensen, *Journal of the American Ceramic Society*, vol. 39, No. 10, 1956, pp. 337–344.

*Primary Examiner*—Helen M. McCarthy
*Attorney, Agent, or Firm*—R. N. Wardell; J. Jamieson, Jr.

[57] ABSTRACT

High purity alumina filters suitable for relatively high temperature molten metal filtering applications are prepared by providing a composition comprising fine grain reactive alumina and a burn out material in amounts sufficient to increase the porosity of the resulting filter structure, the composition being free of grain growth inhibitors in amounts sufficient to inhibit growth of the alumina grains during firing; forming the composition into a honeycomb structure by suitable means; and firing the structure beyond the temperature providing maximum densification of the reactive alumina employed whereby grain growth is fostered. The honeycomb structure is fired sufficiently long for significant growth of the particles (from sizes less than about 5 microns to sizes between 10 and 20 microns) and for the creation of wide grain boundaries between the resulting grains which further act as crack arrestors. A preferred composition includes 19 parts by weight reactive alumina, at least 99.5% pure $Al_2O_3$, and 1 part artificial graphite.

14 Claims, 8 Drawing Figures

APPARATUS AND METHOD OF FILTERING MOLTEN METAL USING HONEYCOMB STRUCTURE OF SINTERED ALUMINA AS FILTER ELEMENT

This is a continuation of application Ser. No. 429,654, filed Sept. 30, 1982, now abandoned.

FIELD OF THE INVENTION

The invention relates to alumina filters having improved thermal shock resistance and means for fabricating the same and in particular to alumina filters for use with molten metal casting operations.

BACKGROUND OF THE INVENTION

An important step in investment-type metal casting operations, where parts are formed directly by casting molten metal into appropriate molds, is the filtering of inclusions such as refractory particles, dross and the like from the molten metal.

U.S. Pat. No. 3,893,917 to Pryor et al. describes molten metal filters of a foamed ceramic structure. The filters are fabricated by providing an open cell, hydrophilic flexible organic foam material having a plurality of interconnected voids and impregnating material with an aqueous ceramic slurry so that the web is coated. After excess slurry is removed from the foam, it is dried and heated to burn out the foam leaving a ceramic foam shell. Molten metal filters may be made in this way from a wide variety of ceramic materials including alumina, chromia, zirconia, magnesia, silica and titanium dioxide. One major problem associated with such filters is their fragility. Typically this limits the maximum size in which they can be prepared and used. Moreover, because such filters rely on internal interconnected open porosity of irregular size and distribution for filtering molten metal, flow rates through such filters are relatively low. In order to cast a sufficient amount of molten metal before the metal has had an opportunity to cool and solidify, it is often necessary to employ a plurality of foam filters each positioned between an individual mold and a common casting ladle serving many molds. This greatly complicates mold construction procedure.

The use of molten metal filters of honeycomb structure is also well known. Because of their relatively massive size, they have been formed in the past from extremely low expansion material such as cordierite and zirconia spinel to provide adequate protection from damage due to thermal shock occurring in metal filtering operations.

OBJECT OF THE INVENTION

It is a first object of the invention to provide a relatively dense, fired alumina structure for high temperature molten metal filtering exhibiting both strength and improved thermal shock damage resistance.

It is yet another object of the invention to provide methods for fabricating such filters.

SUMMARY OF THE INVENTION

Our invention is molten metal filters for high temperature applications made of high purity alumina and having surprising strength and resistance to thermal shock damage. The filters are of honeycomb structure and formed by an aggregation of sintered particles or grains, all or essentially all of the grains in the fired body having sizes apart from the aggregation, of between about 10 and 200 microns and the aggregation comprising at least 98% or more by weight $Al_2O_3$ and being free of alumina grain growth inhibitors in amounts sufficient to have inhibited alumina grain growth. The filters further exhibit a total porosity of about 5% and, preferably, about 10% or more bulk volume. Molten metal filters of the present invention are characterized by the presence of alumina grains having a sharp crystalline form with sharp crystalline corners and wide grain boundaries between the grains characteristic of alumina having undergone exaggerated grain growth. The wide boundaries simulate microcracking and act as crack growth inhibitors. Filters have been fabricated to date wherein the grain aggregation was at least about 99.5% by weight $Al_2O_3$ and at least a major proportion by weight of the grains had average sizes of between about 50 and 150 microns.

The honeycomb structures of the present invention are formed by "overfiring" green (i.e. dried but not sintered) honeycomb structures formed of reactive alumina provided in the form of particles having average sizes of about 5 microns or less and comprising at least 98% or more by weight $Al_2O_3$. "Overfiring" is the firing of the green body to a temperature beyond which the maximum density of the alumina occurs. This results in grain growth of the alumina particles. The body is overfired for a period of time sufficient to generate wide grain boundaries between the grains which act as crack arrestors. Further thermal shock damage resistance is provided by increasing the porosity of the resultant filter. This is accomplished by including, in the sinterable composition used to form the green structure, a minor portion by weight of a burn out composition. The burn out material is added in amounts sufficient to improve the thermal shock damage resistance of the fired filter. An amount of burn-out composition sufficient to increase the total porosity of the fired filter to more than 10% bulk volume is desired, and an amount to increase total porosity to at least about 14% or more bulk volume is preferred. Preferably the burnout composition is artificial graphite but may be any of several known organic burn-out materials such as wheat starch, sawdust, hydrocarbon plastics (such as granulated polyethylene), etc. or mixtures thereof. If desired, it is envisioned that grog (i.e. rejected sintered filter aggregate), milled to appropriate size for the forming process employed, may also be added to the sinterable composition for cost saving.

The invention further comprises the method of fabricating such filters and includes the step of providing a green honeycomb structure of the type previously described and overfiring the structure to foster the aforesaid grain growth and generation of wide particle boundaries and to eliminate the burnout composition. Preferably, the honeycomb structure is formed by extrusion although it is envisioned that other known ceramic methods such as the wrap up of corrugated sheeting may be used to provide the honeycomb shape.

DETAILED DESCRIPTION OF THE INVENTION

Figure 1A:
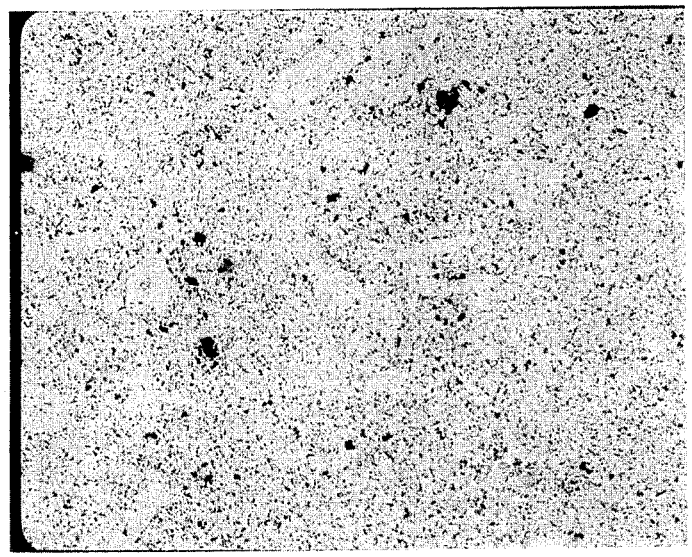
FIG. 1 comprises a first microphotograph FIG. 1"a" revealing at a magnification of 100× the structure of a sintered reactive alumina material either having a grain growth inhibitor and overfired or lacking grain growth inhibitors and fired only to about 1550° C. to achieve maximum densification, a second microphotograph FIG. 1"b" revealing at the same magnification the reactive alumina material without grain growth inhibitors and overfired to about 1650° C. or higher and the network of wide grain boundaries generated during particle grain growth, and a microphotograph FIG. 1"c" revealing at a magnification of 250× the oversized alumina grains and the wide grain boundaries resulting therebetween due to overfiring.

The effort to develop a high purity alumina metal filter was initially directed at providing a filter for use in directional solidification and single crystal growth investment casting applications. Both of these applications are sensitive to the presence of zirconia/zirconium, making the use of a zirconia spinel base composition undesirable.

It was found that overfiring reactive alumina and achieving large grains and wide grain boundaries would obtain a much better thermal shock damage resistance than would be expected from high purity alumina which has a thermal expansion of about $80 \times 10^{-7}$ in./in/@1000° C. It was found that alumina filters made in this manner could be successfully employed in directional solidification casting. It further became apparent that if thermal shock damage resistance could be further improved, such filters would be suitable for use in other casting applications including air melt, equiax and master melt. We have discovered that resistance to thermal shock damage of high purity alumina filters could be improved sufficiently to make their thermal performance comparable to zirconia spinel and other low expansion compositions by increasing the porosity of the filter. This is accomplished by the addition of a suitable burn out ingredient, preferably artificial graphite.

Molten metal filters according to the present invention are made of fine reactive alumina and exhibit, for alumina structure, unusual strength combined with unusual thermal shock damage resistance. The reactive alumina is provided in the form of particles having an average size of less than about 5 microns and all particles or all but a few percent by weight of the particles having a maximum size of less than 10 microns and comprising at least 98% by weight $Al_2O_3$.

An important aspect of the invention is to generate grain growth of the alumina during firing. For this reason, alumina grain growth inhibitors such as magnesium oxide, calcium oxide, silica, cobalt oxide, chromium oxide, iron oxide, nickel oxide and others as described in Cahoon et al., Sintering in Grain Growth of Alpha-Alumina, J. Am. Cer. Soc. Vol. 39, No. 10, 1956, pps. 337-344, incorporated by reference herein, are avoided. As pointed out in Cahoon et al, alumina grains formed by the large grain growth phenomena are crystalline shaped with sharp, crystalline corners. They further exhibit a porous structure within the grains in addition to the spaces between the grain boundaries. When grain growth inhibiting additives are present in more than minor amounts, grain shape is altered to nearly spheroidal particles without well-defined crystalline shape. While it is virtually impossible to avoid the inclusion of any alumina grain growth inhibitors, the grain growth inhibitors in the composition are held to amounts insufficient to inhibit the growth of the alumina particles, preferably less than 0.3% of the weight of the reactive alumina particles.

The composition is formed by suitable techniques into a honeycomb shape, which is typically dried for greater strength. After drying the green piece is "overfired". "Overfiring" consists of heating the piece to a temperature beyond which maximum densification of the reactive alumina occurs. The piece is overfired to foster exaggerated grain growth among the fine reactive alumina particles creating the wide grain boundaries (i.e. open voids between the overgrown particles) simulating microcracking. The voids act as crack arresters giving the resulting structure the improved ability to resist thermal shock damage.

Figure 1B:
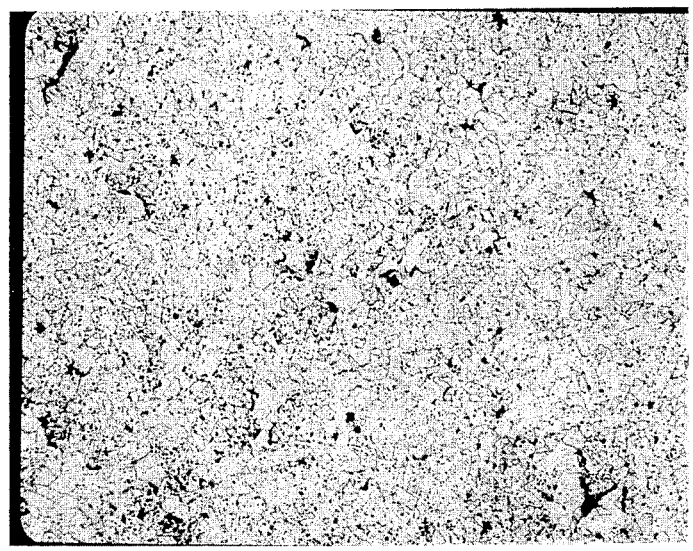
Figure 1C:
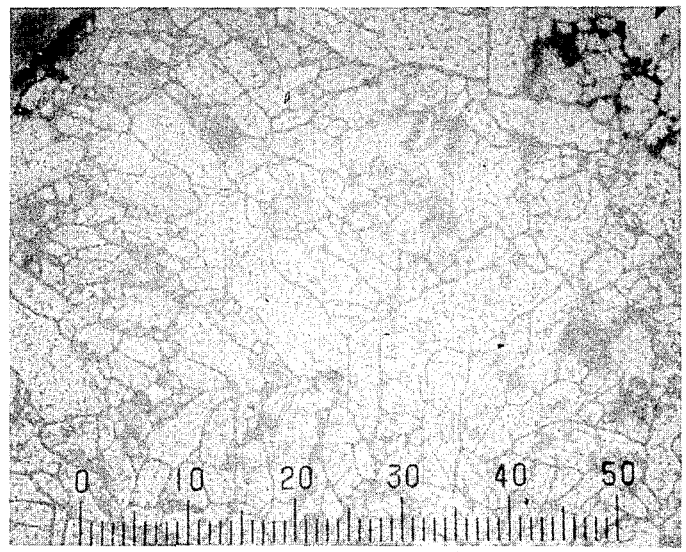
Figure 2A:
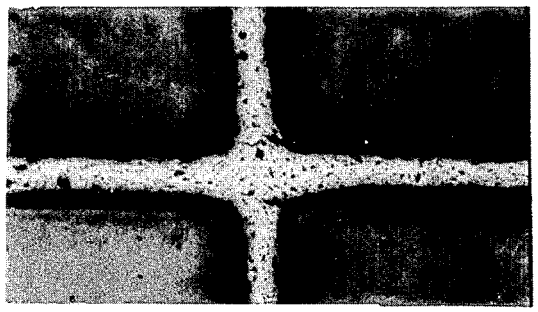
FIG. 2 consists of a first microphotograph FIG. 2"a", revealing at a magnification of 50×, the structure of the sintered alumina material of the present invention without the inclusion of a burn out composition, and a second microphotograph FIG. 2"b" revealing at the same magnification the same material with the additional of a 5% by weight artificial graphite burn out additive illustrating the difference in porosity of the two materials.
Figure 2B:
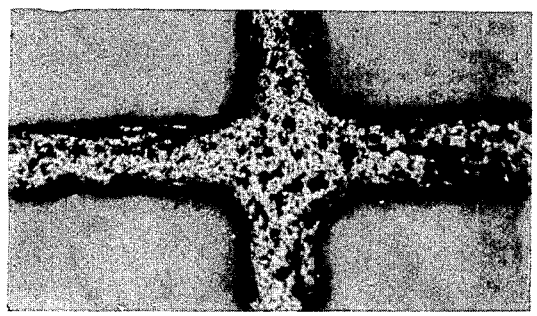

Photomicrograph a of FIG. 1 illustrates at 100× magnification, the substantial lack of grain boundaries when reactive alumina is fired to its maximum densification. Microphotograph b of the same figure illustrates the wide grain boundaries resulting from overfiring the reactive alumina according to the present invention. The wide grain boundaries appear in microphotograph b of FIG. 1 as a network of fine lines crossing the material surface. It is believed that photomicrograph a of FIG. 1 is also a representative depiction of the overfiring of reactive alumina having grain growth inhibitors. Photomicrograph c of FIG. 1 illustrates at 250× magnification the wide grain boundaries when the green pieces are fired as preferred, to generate oversized alumina grains having average sizes between about 10 and 200 microns. Each increment on the scale at the bottom of FIG. 1c represents 10 microns. The total length of the scale is 500 microns. Each of the samples in FIGS. 1a through 1c was previously etched with hydrofluoric acid to enhance visibility of the grains and grain boundaries. The individual alumina grains in the FIG. 1c are porous and have the crystalline shape with sharp, crystalline corners indicative of alumina having undergone large grain growth.

Reactive alumina is characterized by extreme densification upon the application of suitable heat. Typically reactive alumina may be fired to a bulk density of approximately 3.84 grams/cc. or to within about 97% of the 3.96 grams/cc. theoretical density of $Al_2O_3$. This material may presently be obtained from several suppliers, such as Reynolds Metals Co. and Aluminum Company of America, in purities greater than about 99.5% by weight $Al_2O_3$ with a low grain growth inhibitor content.

Resistance of the resulting filter to thermal shock damage is further enhanced by increasing the porosity of the filter. This is accomplished by including a suitable burn out composition in the sinterable composition used to form the filter. A suitable burn-out composition is one which maintains its structural integrity throughout the forming process so as to displace the alumina grains and create voids which remain in the fired aggregate after the firing step. As the name implies, the burn out material should be substantially or entirely incinerated during the firing process. Although it is envisioned that any of a wide variety of burn-out material such as graphite, sawdust, cherry pit flour and ceramic flour may be used, artificial graphite is preferred for several reasons. Its low ash content limits the introduction of alumina grain growth inhibitors and other undesirable contaminants. It acts as a lubricant and aids in the forming step. It further appears to reduce thermal shock stresses induced in firing resulting in fewer firing rejects. It is believed that little thermal shock improvement will be discernible unless more than one part by weight artificial graphite is added to 49 parts by weight alumina. It is further envisioned that ratios of up to about 30 parts by weight graphite to 70 parts by weight alumina may provide filters useful in certain applications. It has been found that a ratio of about 1 part by weight artificial graphite to 19 parts by weight alumina provides discernible improvement in thermal shock resistance and adequate fired strength to the filter. It is not believed that the maximum particle size and size distribution of the burn out composition is particularly significant, but the burn out material particles must be of a small enough size to allow the use of the forming process selected. It is further believed that the burn out material should be provided in sizes fine enough to provide a substantially uniform porosity throughout the fired filter.

Although the filters produced to date have been formed from compositions consisting solely of reactive alumina, artificial graphite and processing agents such as plasticizers and binders, it is envisioned that grog (i.e. rejected sintered filters) may be added to the composition without deleterious effect for cost savings. The grog would comprise aggregate of enlarged alpha phase alumina grains ranging upwards in size, apart from the aggregation, from about 10 microns and 98% or more $Al_2O_3$. The grog would be milled to a size suitable for use with the forming method and apparatus selected.

Honeycomb filters of the present invention may be formed by known ceramic forming techniques such as, for example, extrusion, as is described and claimed, for example, in U.S. Pat. No. 3,790,654, to Bagley, and corrugation as is described and claimed, for example, in U.S. Pat. No. 3,112,184 to Hollenbach, both patents incorporated in their entirety by reference herein. Fired honeycomb structures having cell densities as great as about 700 cells/in.$^2$ (i.e. about 110 cells/cm.$^2$) have been formed by the extrusion and as great as about 1200 cells/in.$^2$ (about 160 cells/cm.$^2$) have been formed by corrugation. The purpose of a molten metal filter is to filter non-metallic inclusions from the molten metal. Depending on the type of casting, inclusions are not permitted to exceed a maximum size and/or amount. The minimum inclusion size removed has been approximately one-third of the cell opening size. A filter can trap inclusions smaller than the individual cell openings, as it has been found that the inclusions tend to collect on the top of the melted alloy before being poured through the filter and to coalesce during the pour, forming bridges across the cell openings. With this information, filter cell density and cell opening size can be selected from the metal and casting operation in which the filter is employed.

EXAMPLE

Figure 3:
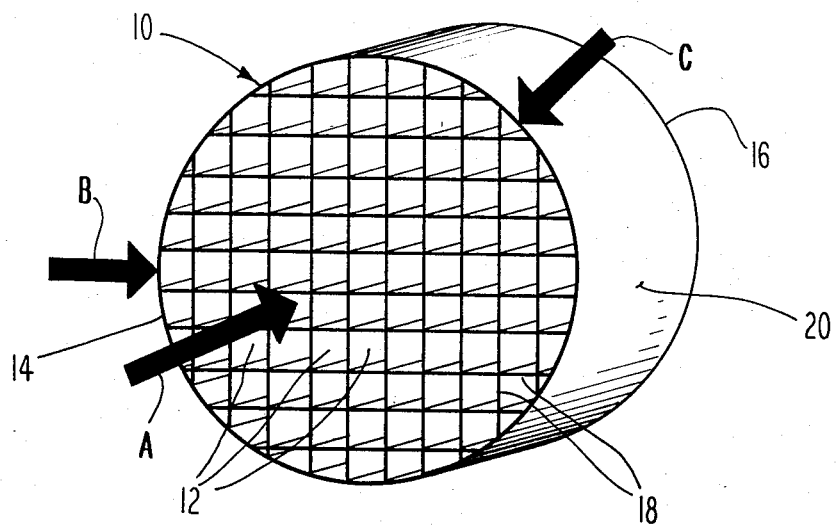
FIG. 3 depicts an exemplary honeycomb filter of the present invention.
Figure 4:
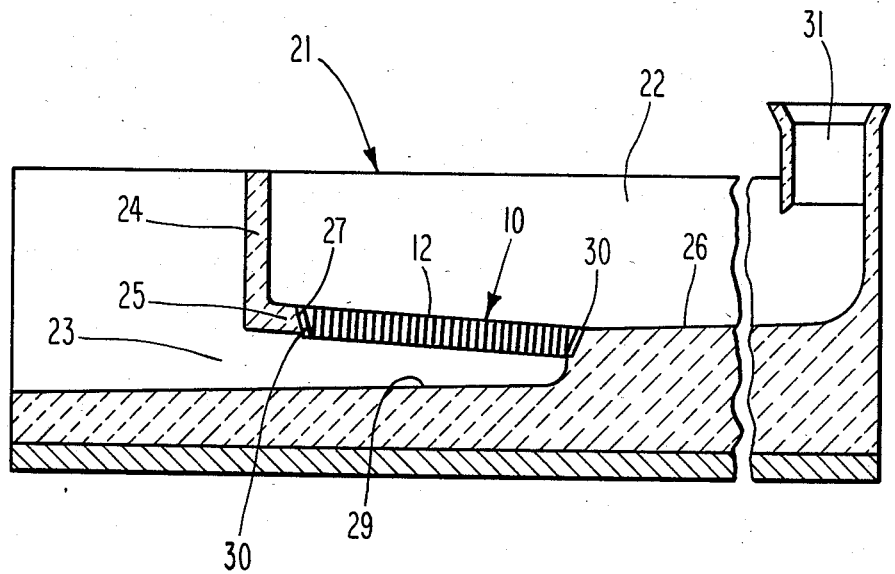
FIG. 4 depicts diagrammatically a longitudinally sectioned view of an exemplary molten aluminum casting apparatus incorporating a filter of the present invention such as the exemplary filter of FIG. 3.

Alumina filters such as the exemplary filter body 10 depicted in FIGS. 3 and 4, have been fabricated by extrusion in a variety of sizes and cellular densities using the sinterable composition listed in Table I.

TABLE I

| Ingredient | Percent by Weight |
|---|---|
| Reactive $Al_2O_3$ | 95.0 |
| Artificial Graphite | 5.0 |
| Methylcellulose | 4.0 (in addition to 100% by weight alumina and graphite) |
| Soap Beads | 1.0 (in addition to 100% by weight alumina and graphite) |
| Deionized Water | 17.5 to 19.5 (preferably 17.5) (in addition to 100% by weight alumina and graphite) |

The chemical composition of the reactive alumina is given in Table II and its particle size distribution (average particle sizes) given in Table III as a function of screen sizes. About 92% by weight of the alumina was of an alpha phase structure.

TABLE II

Reactive Alumina

| Chemical Components | Percent by Weight |
|---|---|
| $Al_2O_3$ | 99.70 |
| $Na_2O$ | 0.03 |
| $SiO_2$ | 0.07 |
| $Fe_2O_3$ | 0.03 |
| CaO | 0.07 |
| Other | 0.10 |

TABLE III

Alumina Particle Size Distribution

| Particle Size* | Fraction (By Weight) Greater Than |
|---|---|
| 5 microns | 3% |
| 3 microns | 11% |
| 2 microns | 29% |
| 1 micron | 78% |
| 0.5 microns | 96% |

*Determined on Mine Safety Appliance particle size analysing equipment.

The material of Tables II and III is indicative of reactive aluminas without grain growth inhibitors supplied by both Reynolds Metals Co. and Aluminum Company of America.

Artificial graphite having the chemical analysis indicated in Table IV and size distribution indicated in Table V was used as the burn out material. Any type of low ash graphite (less than about 2% ash by weight) is believed adequate.

TABLE IV

Artificial Graphite Chemical Analysis

| Ingredient | Percent By Weight |
|---|---|
| Moisture | Nil. |
| Volatile | 0.20% |
| Carbon | 98.20% |
| Ash | 1.60% |
| (Total Sulfur) | (0.05%) |

TABLE V

| Graphite Size Distribution | |
|---|---|
| Typical Screen Analysis (U.S. Standard Sieve) | Percent By Weight |
| +100 mesh | trace |
| +200 mesh | 1.64 |
| +325 mesh | 16.68 |
| −325 mesh | 83.32 |

The use of less than 200 (−200) mesh graphite does not preclude the use of other particle sizes to control open porosity, pore size and pore distribution. However, artificial grades are preferred over natural graphites due to their low ash content. Methylcellulose, soap and water are added to aid in the extrusion and binding of the sinterable composition.

Cooled, dry materials were first blended and then mixed with cooled deionized water and compressed into billets. The billets were extruded into honeycomb monolith structures in the manner described and claimed in the aforesaid U.S. Pat. No. 3,790,654 Bagley. In extrusion, the billet material is passed through a water cooled barrel of the type described in the Cantaloupe et al. U.S. Pat. No. 3,919,384 having a slotted die or mask such as described in the Folmar et al. U.S. Pat. No. 4,008,033, both patents being incorporated by reference herein. In so doing, a smooth skin is formed on the longitudinally extending extruded log surface. The skin surrounds a lattice of thin, interconnected walls forming a multiplicity of hollow channels or cells extending longitudinally along the length of the log. The green logs were then dried in a dielectric oven to give them green strength and ridigity for further handling. The dried logs were cut into various lengths, usually about $\frac{5}{8}$ inch (about 15 mm.) to provide a fired filter approximately one-half inch (about 13 mm.) thick. The cut log lengths were stacked and soaked at a temperature between about 3000° F. to 3150° F. (about 1650° C. to 1735° C.) for a minimum of 4 hours to achieve sintering and exaggerated grain growth and to incinerate all of the artificial graphite. The fired pieces were then sand blasted to remove fine alumina particles desposited during the cutting operation.

FIG. 3 depicts an exemplary filter body 10 of the present invention formed by the extrusion process just described. The body 10 has a multiplicity of hollow, open-ended cells 12 extending in a substantially parallel fashion therethrough from a pair of open, opposing outer surfaces 14 and 16 of the filter 10. The cells 12 are formed by a matrix of thin interconnected walls 18. A skin 20 as previously described, is formed about the remaining outer surface of the body 10 and extends between the open end faces 14 and 16. The cell sizes are greatly enlarged and the wall thicknesses are reduced in FIG. 3 for clarity.

Table VI indicates the dimensional characteristics of various alumina filters which have been fabricated to date.

TABLE VI

| GREEN cells/in.$^2$ (cells/cm.$^2$) | FIRED cells/in.$^2$ (cells/cm.$^2$) | FIRED CELL OPENINGS in. (cm.) | FIRED WALL THICKNESS in. (cm.) | FIRED OPEN FRONTAL AREA (%) |
|---|---|---|---|---|
| 100 | 136 | .070 | .013 | 71.1 |
| (15.5) | (21.1) | .18 | (.033) | |
| 200 | 264 | .050 | .010 | 69.4 |
| (31.0) | (40.9) | .13 | (.025) | |
| 300 | 413 | .040 | .010 | 64.0 |
| (46.5) | (64.0) | .10 | (.025) | |
| 400 | 506 | .038 | .005 | 78.1 |
| (62.0) | (78.4) | .10 | (.012) | |

The filters indicated in Table VI were formed with cells having substantially square transverse cross-sectional areas. The fired cell openings refers to the open area between opposing walls forming the cell; the open frontal area is the combined total of the cell opening areas as a percentage of the total frontal area of the filter. The indicated examples are not intended to be restrictive from the aspect of minimum or maximum cell densities, wall thicknesses, cell openings or percent frontal open areas. Nor is the invention limited to filters having square or circular shaped or employing cells having substantially square transverse cross-sectional geometries.

Typical physical properties for filters made with and without an artifical graphite (5% by weight) burn out composition are listed in Table VII. Ranges are shown for bulk density, open porosity, and total porosity and were determined from laboratory prepared samples. Bulk density and open porosity are determined directly from mercury porosimeter measurements. Total porosity (in percent) is calculated according to the formula:

$$\text{Total Porosity} = \left(1 - \frac{\text{Bulk Density}}{\text{Theoretical Specific Gravity}}\right) \times 100$$

where a Theoretical Specific Gravity of 3.96 was used for the Al$_2$O$_3$. The cold crushing strength figures were obtained from laboratory prepared circular filter samples having the following fired dimensions: 3.06 inch diameter (about 7.7 cm.), $\frac{1}{2}$ inch thickness (about 12.7 mm.), 413 cells/in.$^2$ (about 64 cells/cm.$^2$) and 0.010 inch (about 0.2 mm.) wall thickness. A-, B-, and C-axes are depicted in FIG. 3.

TABLE VII

| Filter Physical Properties | | |
|---|---|---|
| | WITHOUT GRAPHITE ADDITION | WITH GRAPHITE ADDITION |
| Bulk Density (gms/cc) | 3.64–3.74 | 3.41–3.54 |
| Open Porosity (%) | 1.11–1.31 | 1.34–4.26 |
| Total Porosity (%) | 5.66–8.19 | 10.63–13.99 |
| Cold Crushing Strength (psi) | | |
| A-axis | 9432 | 6091 |
| B-axis | 3246 | 2389 |
| C-axis | 355 | 310 |

Filters with and without the artifical graphite additive have been comparison tested in various metal casting operations. Filters used for these tests were squares about 2 inches (about 51 mm.) on a side and one-half inch (12.7 mm.) in thickness and had a fired cell density of about 413 cells/in.$^2$ (64 cells/cm.$^2$). Both filters performed excellently (no cracking) in directional solidification and a single crystal growth casting operations where the filters were preheated to a temperature of about 2600° F. (about 1425° C.) and molten metal temperature was between about 2800° F. and 2900° F. (about 1535° C. and 1595° C.) The performance difference between the porous and non-porous materials was observed in air melt and vacuum melt casting operations where the filters were preheated to only a temperature of about 2000° F. (about 1090° C.) or less and molten metal temperatures were between about 3050° F. and 3250° F. (about 1675° C. and 1785° C.). There, the filter with graphite still performed excellently and no cracking was observed while the performance of the filter without graphite was adequate but some cracking did occur. No attempt has been made to test these filters in all filter applications in which they may be useful. Experimental trails have shown that in some applications, the filters will be suitable for use without preheating.

FIG. 4 depicts an envisioned application of the molten metal filter 10 of the present invention in an aluminum casting operation. A molten metal filtration chamber 21 comprises an inlet portion 22 and outlet portion 23 separated by an intermediate refractory wall 24. The wall 24 joins with a base portion 25 connected to and forming a part of a floor 26 of the inlet portion 22. The base portion 25 contains an aperture 27 for the passage of molten metal from the inlet portion 22 to the outlet portion 23. The filter 10 is interposed across the aperture 27 such that one end face (14 or 16) facing upstream of the molten metal flow path through the aperture 27 (i.e. into the inlet portion 22). The outlet portion 23 has a floor 29 which is lower than the inlet floor 26 to facilitate flow of the molten metal through the aperture 27 through the filter 10. Conventional sealing means such as a suitable ceramic cement 30 replaceably holds and seals the filter 10 within the aperture 27 so that all the molten metal passes through the filter 10 and passing from the inlet portion 22 to the outlet portion 23. A pouring spout 31 is provided to receive the unfiltered molten metal.

Figure 5:
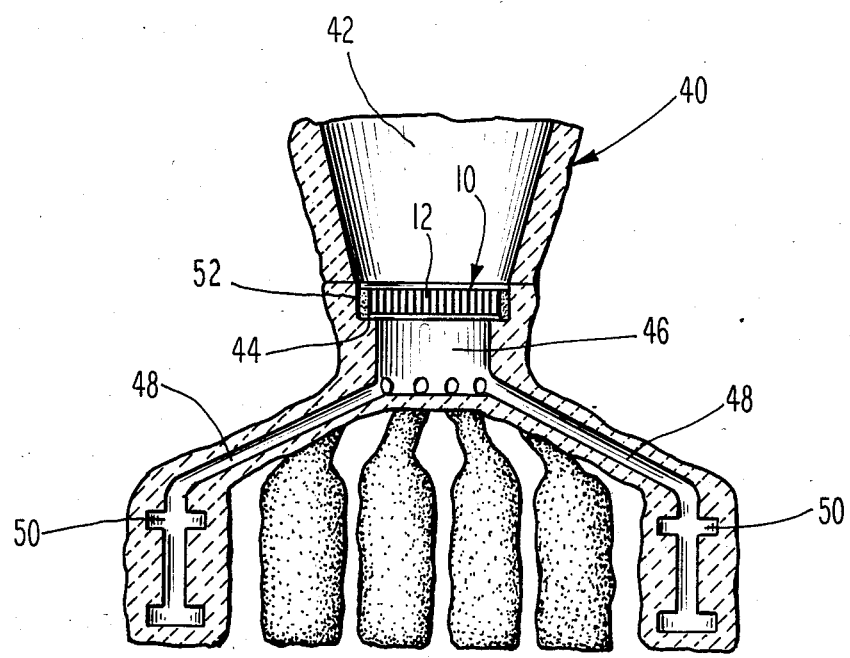
FIG. 5 depicts diagrammatically a longitudinally sectioned exemplary investment casting apparatus also incorporating a filter of the present invention such as the exemplary filter of FIG. 3.

FIG. 5 is a sectioned, diagrammatic view of an exemplary investment casting type mold. The mold or "cast cluster" 40 includes a pour cup 42 having a lip 44 to receive a molten metal filter of the present invention such as the filter body 10 of FIG. 3. A distribution cup 46 of the cast cluster 40 beneath the filter 10 receives the filtered molten metal passing from the pour cup 42 through cells 12 of the filter 10 and directs it to a plurality of runners 48 each leading to an individual part mold 50. Typically, the cast cluster is formed by molding an alumina, zircon or other suitable material about a wax model and firing the structure to sinter the material and remove the wax. Alumina sponge filters, when employed with such an apparatus, are placed in each runner 48 so as to assure adequate molten metal flow rates into the individual part molds 50. Not only does this greatly complicate set-up procedures, it has been found that the cast cluster cannot be adequately cleaned once the filters are in place to assure that loose debris on the downstream side of the foam filter is entirely removed. By contrast, filters of the present invention may be installed after mold forming and cleaning by securing the filter 10 into position on the ledge 44 by suitable means such as the use of an alumina zircon mortar or other suitable ceramic cement indicated at 52.

It should be understood that while the present invention has been described in detail with respect to certain illustrative and specific embodiments thereof, it should not be considered limited to such composition methods and structures but may be used in other ways without departing from the spirit of the invention and the scope of the appended claims.

What is claimed is:

1. An apparatus comprising:
   a molten metal filter of honeycomb structure with a multiplicity of thin walls defining a multiplicity of open ended, substantially uniform, hollow cells extending between a pair of honeycombed outer surfaces of the filter, said thin walls being formed by a sintered aggregation of alumina grains, essentially all of said grains having a crystalline form with sharp crystalline corners and wide boundaries between the grains characteristic of alumina having undergone exaggerated grain growth, the aggregation further being at least 98% or more by weight $Al_2O_3$ and free of alumina grain growth inhibitors in amounts effective to having inhibited alumina grain growth;
   means for conveying molten metal to be filtered to one of said honeycombed surfaces of the filter; and
   means for conveying the molten metal from the remaining honeycombed surface of the filter after passage through said cells.

2. The apparatus of claim 1 wherein essentially all of said grains have average sizes of between about 10 and 200 microns.

3. The apparatus of claim 2 wherein said aggregration has a total porosity of about 10% or more bulk volume.

4. The apparatus of claim 3 wherein the aggregation is at least about 99.5% by weight $Al_2O_3$ and a major proportion by weight of said grains have average sizes of between about 50 and 150 microns.

5. The apparatus of claim 4 wherein the total porosity of the aggregation is also no greater than about 14%.

6. The apparatus of claim 5 wherein said aggregation has an open porosity of no greater than about 5%.

7. A method of filtering molten metal comprising the steps of:
   providing a molten metal filter of honeycomb structure formed by a multiplicity of thin walls defining a multiplicity of open ended, substantially uniform, hollow cells extending between a pair of honeycombed outer surfaces of the filter, said thin walls being formed by a sintered aggregation of alumina grains, essentially all of said grains having a crystalline form with sharp crystalline corners and wide boundaries between the grains characteristic of alumina having undergone exaggerated grain growth, the aggregation further being at least 98% or more by weight $Al_2O_3$ and free of grain growth inhibitors in amounts effective to have inhibited alumina grain growth;
   conveying molten metal to be filtered to one of said honeycombed surfaces of the filter;
   passing the molten metal through said one honeycombed surface, the hollow cells of the structure and said remaining honeycombed surface; and
   conveying the filtered molten metal away from said remaining honeycombed surface of the filter.

8. The method of claim 7 wherein said aggregation is formed with a content of at least about 99.5% by weight $Al_2O_3$ and a major proportion by weight of the sintered alumina grains have average sizes of between about 50 and 150 microns.

9. The method of claim 8 wherein said step of providing further comprises the step of forming the sintered aggregation with a total porosity of about 10% or more bulk volume.

10. The method of claim 7 wherein said step of providing further comprises the steps of:
forming a green honeycomb monolith of interconnected continuous thin walls from a sinterable alumina mixture, at least essentially all of the alumina of the mixture being reactive alumina grains having average sizes of about 5 microns or less and the mixture further being free of alumina grain growth inhibitors in amounts effective to inhibit growth of the alumina grains during sintering; and
sintering the green monolith structure at a temperature sufficiently high and for a period sufficiently long to cause essentially all remaining alumina grains to undergo exaggerated grain growth to average sizes of between about 10 and 200 microns.

11. The method of claim 10 wherein at least said reactive alumina added to the mixture has a purity of at least about 99.5% by weight $Al_2O_3$.

12. The method of claim 7 wherein said forming step further comprises the step of:
extruding said mixture in the form of said green honeycombed structure.

13. The method of claim 7 wherein said step of providing further comprises the step of:
including in the mixture a burn out material substantially uniformly distributed throughout each of the thin walls of the monolith in an amount sufficient to increase the resistance of the monolith after sintering to damage from thermal shock; and
said sintering step further comprises having the monolith in an oxygen atmosphere for a period sufficiently long to also combust at least essentially all of the burn out composition.

14. A method of filtering molten metal comprising the steps of:
providing a molten metal filter of honeycombed structure formed by a sintered aggregation of alumina grains, essentially all of said grains having a crystalline form with sharp crystalline corners and wide boundaries between the grains characteristic of alumina having undergone exaggerated grain growth and having average sizes of between about 10 and 200 microns, the aggregation comprising at least 98% or more by weight $Al_2O_3$ and free of alumina grain growth inhibitors in amounts sufficient to have inhibited alumina grain growth, the aggregation of grains forming a multiplicity of thin walls defining a multiplicity of hollow, open-ended cells extending between a pair of honeycombed outer surfaces of the filter; and
passing a charge of molten metal through the cells from one of said honeycombed outer surfaces through said cells and the remaining honeycombed outer surface whereby solid impurities in the molten metal charge are desposited on the filter.

* * * * *